(12) United States Patent
Choi et al.

(10) Patent No.: US 8,577,089 B2
(45) Date of Patent: Nov. 5, 2013

(54) APPARATUS AND METHOD FOR DEPTH UNFOLDING BASED ON MULTIPLE DEPTH IMAGES

(75) Inventors: Ouk Choi, Yongin-si (KR); Hwa Sup Lim, Hwaseong-si (KR); Kee Chang Lee, Yongin-si (KR); Seung Kyu Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 191 days.

(21) Appl. No.: 13/064,096

(22) Filed: Mar. 4, 2011

(65) Prior Publication Data

US 2011/0305370 A1 Dec. 15, 2011

(51) Int. Cl.
*G06K 9/00* (2006.01)
*H04N 5/232* (2006.01)

(52) U.S. Cl.
USPC ........................................ 382/106; 348/211.1

(58) Field of Classification Search
USPC ........ 382/106, 10; 348/46, 140, 211.9, 427.1, 348/788; 356/3, 4.06, 21, 482
See application file for complete search history.

(56) References Cited

U.S. PATENT DOCUMENTS

| | | | |
|---|---|---|---|
| 5,699,444 A * | 12/1997 | Palm .............................. | 382/106 |
| 6,424,422 B1 * | 7/2002 | Kamon et al. ................. | 356/623 |
| 2011/0234756 A1 * | 9/2011 | Adler et al. ..................... | 348/46 |

FOREIGN PATENT DOCUMENTS

| | | |
|---|---|---|
| JP | 2006-285946 | 10/2006 |
| KR | 10-0513055 | 8/2005 |
| KR | 10-0748719 | 8/2007 |
| KR | 10-0930286 | 11/2009 |

OTHER PUBLICATIONS

European Search Report for European Patent Application No. 11165279.8 dated Nov. 7, 2011.
David Droeschel et al., "Probabilistic Phase Unwrapping for Time-of-Flight Camers", XP-002660845, Munich, Germany, Jun. 7, 2010 pp. 318-324.
Xianyu Su et al., "Dynamic 3-D Shape measurement method: A review", Optics and Lasers in Engineering, China, vol. 48, Feb. 1, 2010, pp. 191-204.
Elena Stoykova et al., "3-D Time-Varying Scene Capture Technologies—A Survey", IEEE Transactions on Circuits and Systems for Video Technology, vol. 17, No. 11, Nov. 1, 2007, pgs.
Andrew D. Payne et al., "Multiple Frequency Range Imaging to Remove Measurement Ambiguity", XP-002660844, New Zealand, Jul. 1-3, 2009, pp. 139-148.
Shane H. McClure et al., "Resolving depth measurement ambiguity with commercially available range imaging cameras", XP-002660846, New Zealand, vol. 7538, 2010, pp. 75380K-75380K-12.
D. Falie et al., "Wide Range Time of Flight Camera for Outdoor Surveillance", MRRS-2008, Romania, Sep. 22, 2008, pp. 79-82.

* cited by examiner

*Primary Examiner* — Abolfazl Tabatabai
(74) *Attorney, Agent, or Firm* — Staas & Halsey LLP

(57) ABSTRACT

Provided is a depth image unfolding apparatus and method that may remove a depth fold from a depth image to restore a three-dimensional (3D) image. The depth image unfolding apparatus may include an input unit to receive inputted multiple depth images with respect to the same scene, the multiple depth images being photographed based on different modulation frequencies of a fixed photographing device, a depth fold estimator to estimate a number of depth folds based on a distance between multiple three-dimensional (3D) points of multiple pixels indicating the same location of the scene in the multiple depth images, and an output unit to output the multiple depth images from which depth folds are removed based on the estimated number of depth folds.

21 Claims, 18 Drawing Sheets

FIG. 1
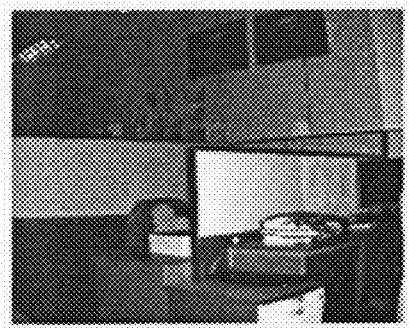
AMPLITUDE IMAGE
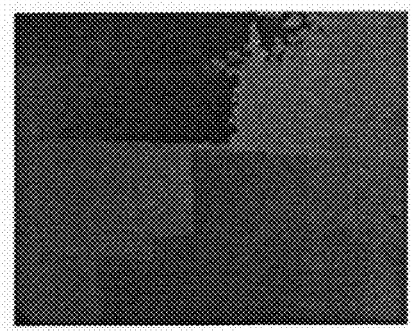
MEASURED DEPTH IMAGE
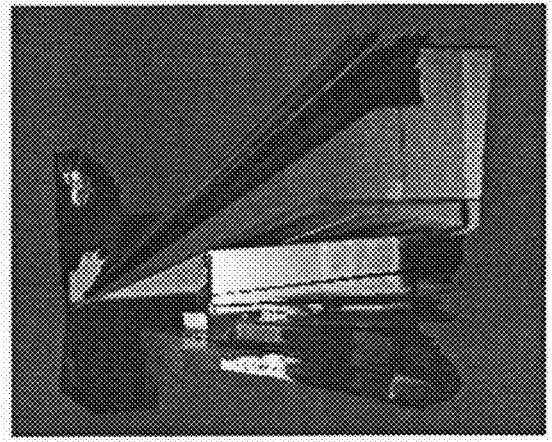
EXPRESSION OF MEASURED DEPTH IMAGE

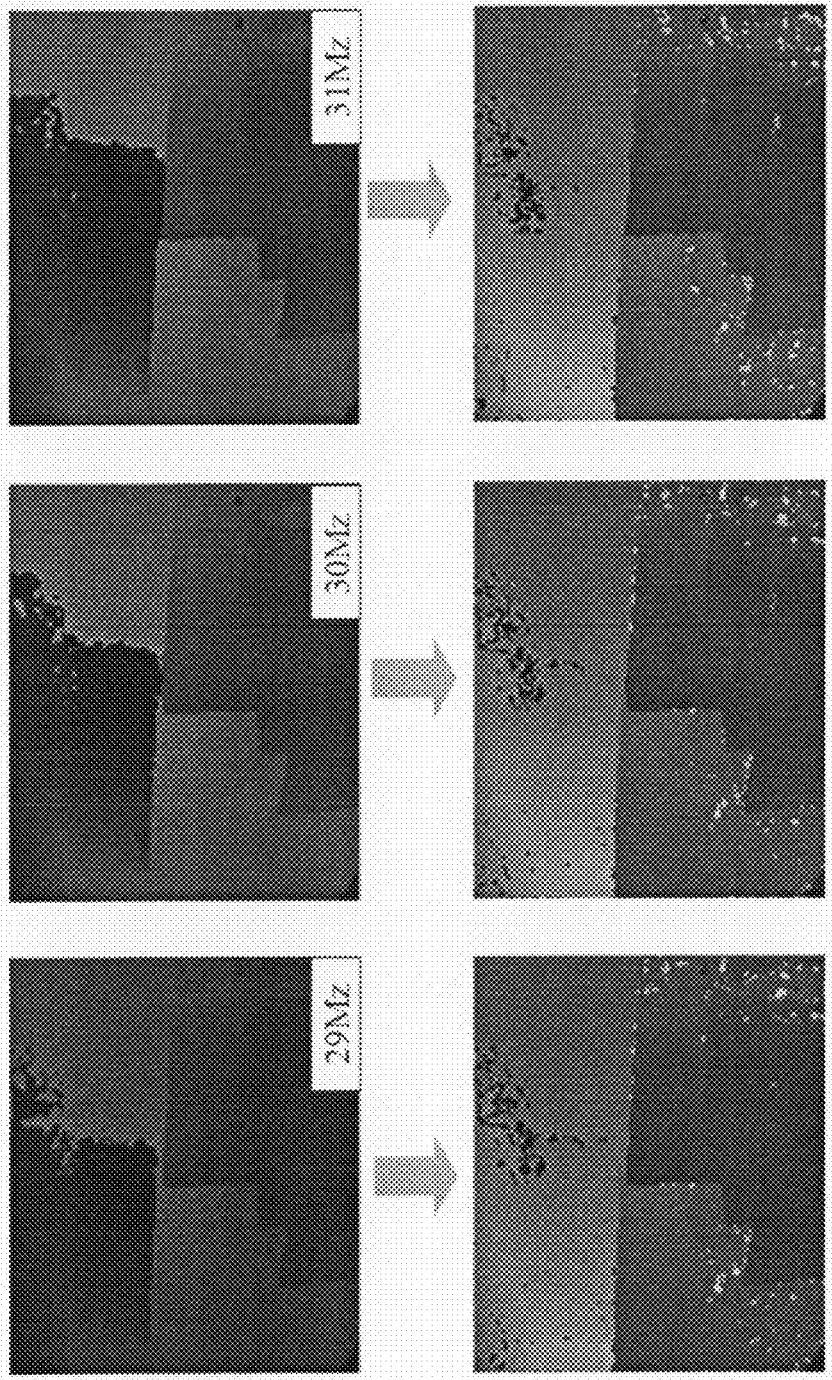

MEASURED
DEPTH IMAGE

POST-DEPTH
FOLD REMOVAL

FIG. 11 (a) POINT OF VIEW 1 (b) POINT OF VIEW 2 (c) POINT OF VIEW 3

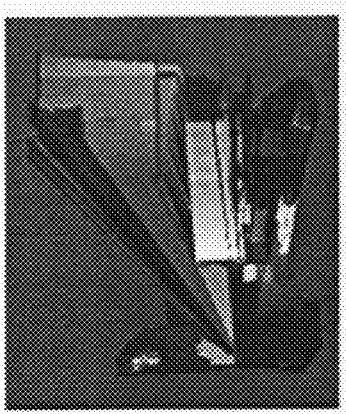
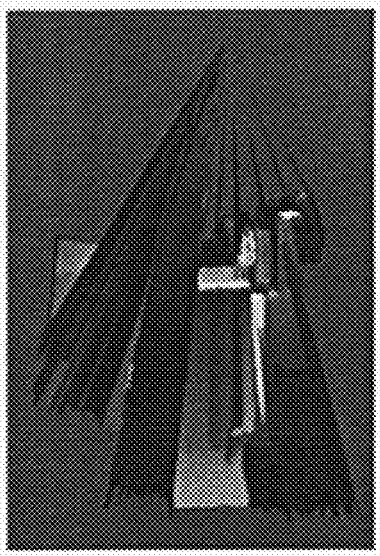
FIG. 15
PRE-DEPTH FOLD REMOVALRE
POST-DEPTH FOLD REMOVAL

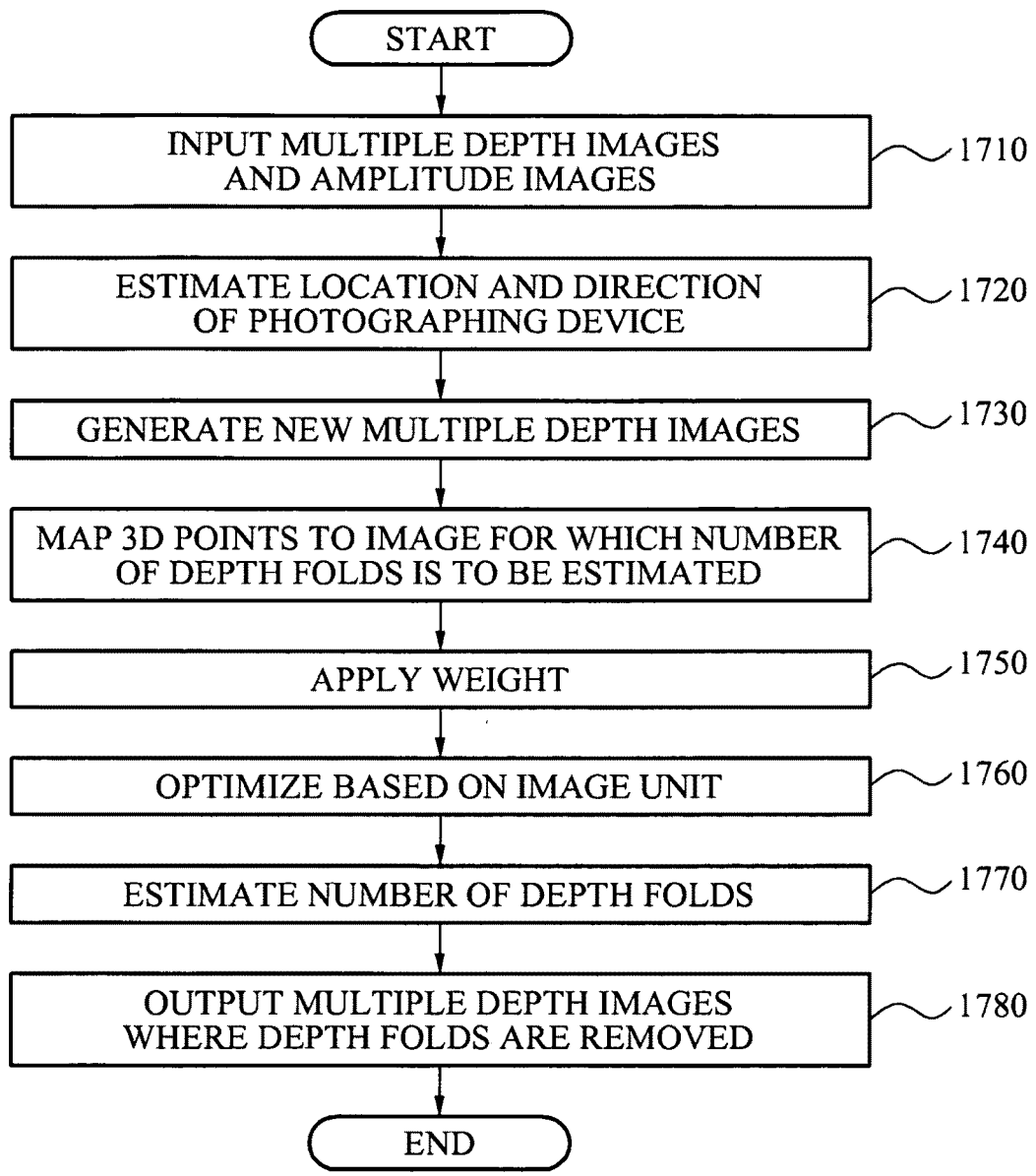

APPARATUS AND METHOD FOR DEPTH UNFOLDING BASED ON MULTIPLE DEPTH IMAGES

CROSS-REFERENCE TO RELATED APPLICATIONS

This application claims the priority benefit of Korean Patent Application No. 10-2010-0055771, filed on Jun. 14, 2010, in the Korean Intellectual Property Office, the disclosure of which is incorporated herein by reference.

BACKGROUND

1. Field

One or more example embodiments of the present application relate to an apparatus and method of restoring a three-dimensional (3D) image using a depth image.

2. Description of the Related Art

A conventional depth camera may be used to restore a three-dimensional (3D) image. A maximal distance measured by the conventional depth camera may be determined based on a modulation frequency used when the camera performs photography. For example, when the modulation frequency is 30 MHz, the maximal distance to be measured by the conventional depth camera may be 5 m. However, a real world that is to be restored as a 3D image may sometimes include an object that is located more than 5 meters away from the camera and thus, the depth camera may regard objects located beyond the maximal distance as being located within the maximal distance and may measure distances as such. This phenomenon may be referred to as depth folding. According to a conventional method, a single depth image is used to overcome the depth folding. However, it is difficult to determine whether a measured distance is a real distance or a distance affected by depth folding.

SUMMARY

The foregoing and/or other aspects are achieved by providing a depth image unfolding apparatus, the apparatus including a processor to control one or more processor-executable units, an input unit to receive inputted multiple depth images with respect to a same scene, the multiple depth images being photographed based on different modulation frequencies of a fixed photographing device, a depth fold estimator to estimate a number of depth folds based on a distance between multiple three-dimensional (3D) points of multiple pixels indicating the same location of the scene in the multiple depth images, and an output unit to output the multiple depth images from which one or more depth folds have been removed based on the estimated number of depth folds.

The depth fold estimator may sum smallest distances between the multiple 3D points, while changing a number of depth folds with respect to the multiple 3D points corresponding to the multiple pixels indicating the same location of the scene, and may estimate a number of depth folds of when the sum is a minimal value, as an actual number of depth folds.

The depth fold estimator may include weighting unit to apply a weight to a measured distance between the multiple 3D points based on a distance between 3D points corresponding to adjacent pixels, to enable depth values of the adjacent pixels in each of the multiple depth images to be similar, and an optimizing unit to optimize each of the multiple depth images based on an image unit, using the distance between multiple 3D points of the multiple pixels indicating the same location of the scene, and using the weighted distance weighted based on the distance between the 3D points corresponding to the adjacent pixels.

The adjacent pixels correspond to four or eight pixels adjacent to a pixel for which a number of depth folds is to be estimated.

The optimizing unit may perform optimizing based on a graph cut algorithm or a belief propagation algorithm.

The foregoing and/or other aspects are achieved by providing a depth image unfolding apparatus, the apparatus including a processor to control one or more processor-executable units, an input unit to receive inputted multiple depth images and amplitude images with respect to a same scene, the multiple depth images and amplitude images being photographed, while changing a location of a photographing device, a location and direction estimator to generate multiple corrected amplitude images based on the multiple depth images and amplitude images, and to estimate, based on similar 3D feature points located in the multiple corrected amplitude images, a location and direction of the photographing device corresponding to the multiple corrected amplitude images, a depth fold estimator to estimate a number of depth folds based on a distance between a 3D point of a pixel generated based on the estimated location and direction of the photographing device and a 3D point of a pixel for which the number of depth folds is to be estimated, and an output unit to output the multiple depth images from which depth folds are removed based on the estimated number of depth folds.

The depth fold estimator may include a depth image generator to generate new multiple depth images by changing a number of depth folds with respect to all pixels of the multiple depth images, and a mapping unit to map, to an image for which a number of depth folds is to be estimated, 3D points corresponding to all pixels in the new multiple depth images based on the estimated location and direction of the photographing device, and a number of depth folds applied to a mapped 3D point that has a smallest distance to a 3D point of the image for which the number of depth folds is to be estimated is estimated as an actual number of depth folds.

The depth fold estimator may include a weighting unit to apply a weight to a measured distance between the 3D points based on a distance between 3D points corresponding to adjacent pixels, to enable depth values of the adjacent pixels in each of the multiple depth images to be similar, and an optimizing unit to optimize each of the multiple depth images based on an image unit, using the distance between the 3D point of the pixel generated based on the estimated location and direction of the photographing device and the 3D point of the pixel for which the number of depth folds is to be estimated, and using the weighted distance weighted based on the distance between the 3D points corresponding to the adjacent pixels.

The location and direction estimator may detect feature points with respect to the multiple corrected amplitude images, and may perform matching with respect to the detected feature points to estimate the location and direction of the photographing device corresponding to the multiple corrected amplitude images.

The foregoing and/or other aspects are achieved by providing a depth image unfolding method, the method including receiving inputted multiple depth images with respect to a same scene, the multiple depth images being photographed based on different modulation frequencies of a fixed photographing device, estimating a number of depth folds based on a distance between multiple 3D points of multiple pixels indicating the same location of the scene in the multiple depth images, and outputting, by way of a processor, the multiple depth images from which one or more depth folds have been removed based on the estimated number of depth folds.

The estimating may include summing smallest distances between the multiple 3D points, while changing a number of depth folds with respect to the multiple 3D points corresponding to the multiple pixels indicating the same location of the scene, and estimating a number of depth folds of when the sum is a minimal value, as an actual number of depth folds.

The estimating may include applying a weight to a measured distance between the multiple 3D points based on a distance between 3D points corresponding to adjacent pixels, to enable depth values of the adjacent pixels in each of the multiple depth images to be similar, and optimizing each of the multiple depth images based on an image unit, using the distance between multiple 3D points of the multiple pixels indicating the same location of the scene, and using the weighted distance weighted based on the distance between the 3D points corresponding to the adjacent pixels.

The foregoing and/or other aspects are achieved by providing a depth image unfolding method, the method including receiving inputted multiple depth images and amplitude images with respect to a same scene, and the multiple depth images and amplitude images are photographed, while changing a location of a photographing device, generating multiple corrected amplitude images based on the multiple depth images and amplitude images, and estimating, based on similar 3D feature points located in the multiple corrected amplitude images, a location and direction of the photographing device corresponding to the multiple corrected amplitude images, estimating a number of depth folds based on a distance between a 3D point of a pixel generated based on the estimated location and direction of the photographing device and a 3D point of a pixel for which the number of depth folds is to be estimated, and outputting, way of a processor, the multiple depth images from which depth folds are removed based on the estimated number of depth folds.

The estimating of the number of the depth folds may include generating new multiple depth images by changing a number of depth folds with respect to all pixels of the multiple depth images, and mapping, to an image for which a number of depth folds is to be estimated, 3D points corresponding to all pixels in the new multiple depth images based on the estimated location and direction of the photographing device, and a number of depth folds applied to a mapped 3D point that has a smallest distance to a 3D point of the image for which the number of depth folds is to be estimated is estimated as an actual number of depth folds.

The estimating of the number of the depth folds may include applying a weight to a measured distance between the 3D points based on a distance between 3D points corresponding to adjacent pixels, to enable depth values of the adjacent pixels in each of the multiple depth images to be similar, and optimizing each of the multiple depth images based on an image unit, using the distance between the 3D point of the pixel generated based on the estimated location and direction of the photographing device and the 3D point of the pixel for which the number of depth folds is to be estimated, and using the weighted distance weighted based on the distance between the 3D points corresponding to the adjacent pixels.

The estimating of the location and direction may include detecting feature points with respect to the multiple corrected amplitude images, and matching with respect to the detected feature points to estimate the location and direction of the photographing device corresponding to the multiple corrected amplitude images.

The foregoing and/or other aspects are achieved by providing an apparatus for unfolding a depth image using multiple depth images of a particular scene where each depth image of the scene is photographed using a different camera modulation frequency, the apparatus including a processor to control one or more processor-executable units, a depth fold estimating unit to estimate a number of depth folds based on a distance between multiple three-dimensional (3D) points of multiple pixels indicating an identical location of the scene in the multiple depth images, and an output unit to output multiple depth images from which depth folds have been removed based on the estimated number of depth folds.

Additional aspects of embodiments will be set forth in part in the description which follows and, in part, will be apparent from the description, or may be learned by practice of the disclosure.

One or more example embodiments may effectively remove a depth fold from a depth image and thus, a maximal distance measured by a sensor may be enhanced more than two-fold without changing hardware of a depth image photographing device.

One or more example embodiments may remove a depth fold from a depth image and thus, a real world is restored as a three-dimensional (3D) structure without distortion.

One or more example embodiments may remove a depth fold from a depth image and thus, may be applied to a 3D photo photographed by a fixed photographing device in a large scale environment that is beyond a maximal distance of a depth camera or may be applied to a 3D video recorded by a moving photographing device.

One or more example embodiments may remove a depth fold from a depth image and may restore a 3D image without distortion and thus, may be applied to a 3D game or an augmented reality.

BRIEF DESCRIPTION OF THE DRAWINGS

These and/or other aspects will become apparent and more readily appreciated from the following description of embodiments, taken in conjunction with the accompanying drawings of which:

FIG. 1 illustrates an image photographed by a depth image camera;

FIG. 7B illustrates images restored based on the estimated number of depth folds of FIG. 7A;

FIG. 15 illustrates a pre-depth fold removal three-dimensional (3D) structure and a post-depth fold removal 3D structure;

FIG. 17 is a flowchart illustrating a depth image unfolding method using a dynamic photographing device according to example embodiments.

DETAILED DESCRIPTION

Figure 2:
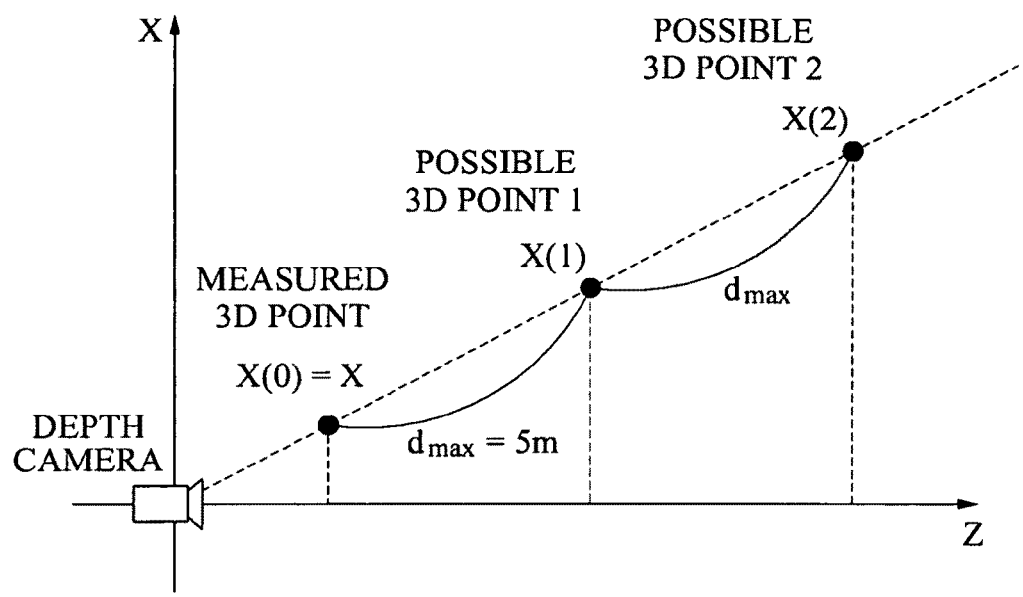
FIG. 2 illustrates a maximal distance that a depth image camera measures and a depth fold.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image photographed by a depth camera.

A depth camera may measure an amplitude image and a depth image based on an intensity of a light that is received after emission. The amplitude image may be measured based on an intensity of a light reflected or refracted from an object and thus, may help identify the object. The depth image may express a distance between the object and the depth camera, namely, perspective. Referring to FIG. 1, a dark portion in the measured depth image may represent a portion close to the depth camera and a bright portion may represent a portion far from the camera. For example, compared with the amplitude image, an object at the top of the depth image of FIG. 1 is farther from the depth camera than an object at the bottom of the depth image of FIG. 1, and thus the object at the top is expressed as a dark portion. Therefore, the top and the bottom in the depth image measured by the depth camera may not be distinguished from each other. When the measured depth image may be three-dimensionally expressed, a 3D image may be indirectly embodied.

FIG. 2 illustrates a maximal distance that a depth image camera measures and a depth fold.

A maximal distance (dmax) that the depth camera may measure may be determined based on a modulation frequency used when the depth camera photographs. In this example, the depth camera may include a time-of-flight (TOF)-based depth camera. For example, when the modulation frequency is 30MHz, the depth camera may measure up to 5 m. However, in a real world that is a target of the photographing, an object may be located beyond the 5 m, which is dmax. In this example, a real distance between the depth camera and the object is d and a distance measured by the depth camera may be d-kdmax. This phenomenon is referred to as a depth folding. k may be a positive integer that enables d-kdmax to be greater than zero and less than dmax, and may denote a number of depth folds. When the real distance is 7 m, dmax is 5 m and thus, the measured distance may be 2 m and k, which is the number of depth folds, may be 1. When the real distance is 12 m, dmax is 5 m and thus, the measured distance is 2 m and k, which is the number of depth folds, may be 2.

Referring to FIG. 2, the depth image photographed by the depth camera may be represented as a two-dimensional (2D) plane including an x-axis and a z-axis. The photographed depth image may include information associated with a three-dimensional (3D) point of the measured object for each pixel. Coordinates of a 3D point measured from a single pixel of the depth image is X, $X=(X,Y,Z)^T$. A range may denote a distance from a center of the depth camera to the 3D point projected on the pixel, and a range of X may be $\|X\|$. X(0) may denote a measured 3D point for which the number of depth folds is zero, and, in this example, coordinates may be X. X(1) may denote a possible 3D point for which the number of depth folds is one, and X(1) may be dmax far from the X(0). X(2) may denote a possible 3D point for which the number of depth folds is two, and X(2) may be 2dmax far from the X(0).

When a number of depth folds of a pixel is one, a d(1) that is a distance between a 3D point and the depth camera may be $\|X\|$+dmax. Therefore, when the number of depth folds is k, the d(k) that is a distance between the 3D point and the depth camera may be $\|X\|$+kdmax. In this example, coordinates of the real 3D point may be calculated based on a triangle similarity formula, such as Equation 1. When k that is the number of depth folds is given, a possible 3D point may be calculated based on the measured 3D point.

$$X(k) = \frac{d(k)}{d(0)} X(0) \qquad \text{[Equation 1]}$$

In Equation 1, X(0) may denote X and d(0) may be $\|X\|$.

Figure 3:
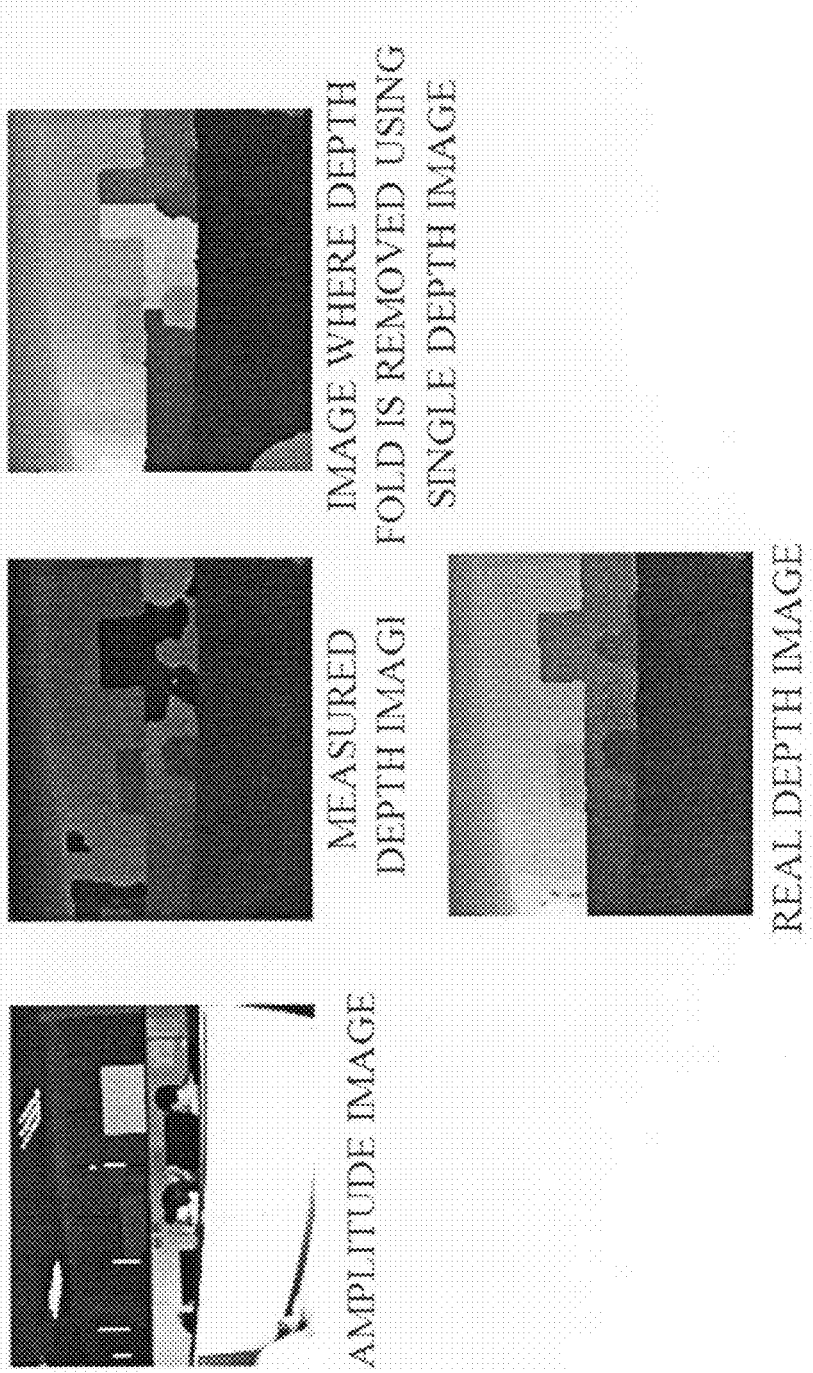
FIG. 3 illustrates an image where depth folds are removed using a single depth image according to a conventional art.

FIG. 3 illustrates an image in which depth folds are removed using a single depth image according to a conventional art.

Referring to FIG. 3, a conventional scheme of removing the depth fold may be performed based on the single depth image. In this example, when all pixels of the depth image include the depth folds, it is difficult to remove the depth folds. Only when pixels that do not include depth folds are given, may the depth folds be removed. According to the conventional scheme, when a difference between measured depth values of adjacent pixels is high, a folding boundary may be detected. However, it is difficult to determine whether the difference is caused by a difference between real depths of the adjacent pixels or caused by the depth fold. Referring to FIG. 3, although an object in a top of the measured depth image is far from the depth camera, the object may be expressed as a dark portion and thus, a distance between the object and the depth camera may not be accurately measured. An image where the depth folds are removed using the single image may relatively accurately measure the depth, compared with the measured depth image. However, still, a depth in a middle of the image may not be accurately measured.

Figure 4:
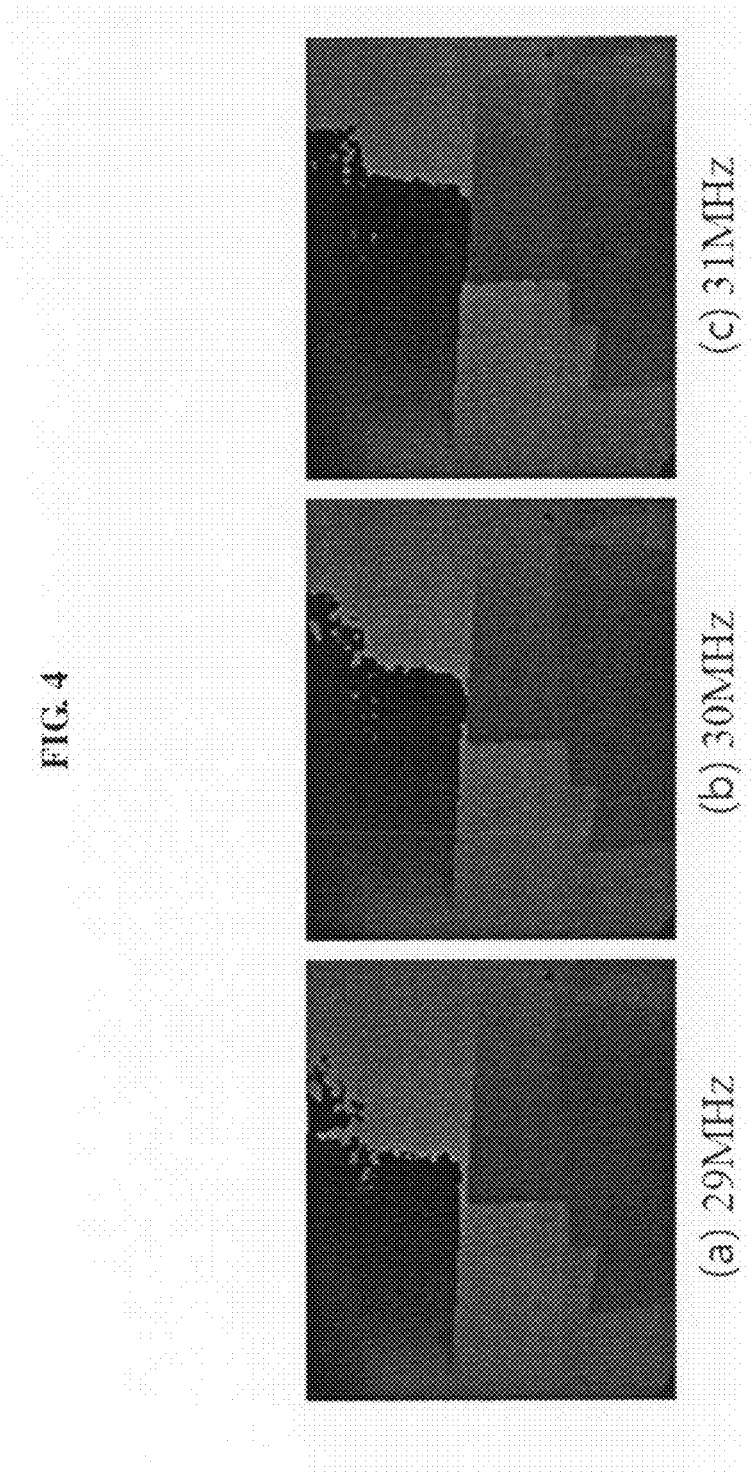
FIG. 4 illustrates depth images obtained by photographing the same scene using different modulation frequencies through a fixed photographing device according to example embodiments.

FIG. 4 illustrates depth images obtained by photographing the same scene using different modulation frequencies using a fixed photographing device, according to example embodiments.

A depth image unfolding apparatus may use multiple images of the same scene. When the depth image unfolding apparatus uses the fixed photographing device, a maximal distance may be determined based on modulation frequencies used for the photographing and thus, the depth image unfolding apparatus may obtain the multiple images by photographing the same scene based on different modulation frequencies. Images in FIG. 4 may be multiple depth images photographed at the same point of view based on different modulation frequencies such as 29 MHz (a), 30 MHz (b), and 31 MHz (c).

The multiple depth images may target a static scene that lacks a moving object. The multiple depth images may be obtained by fixing the depth camera or by moving the depth camera.

Figure 5:
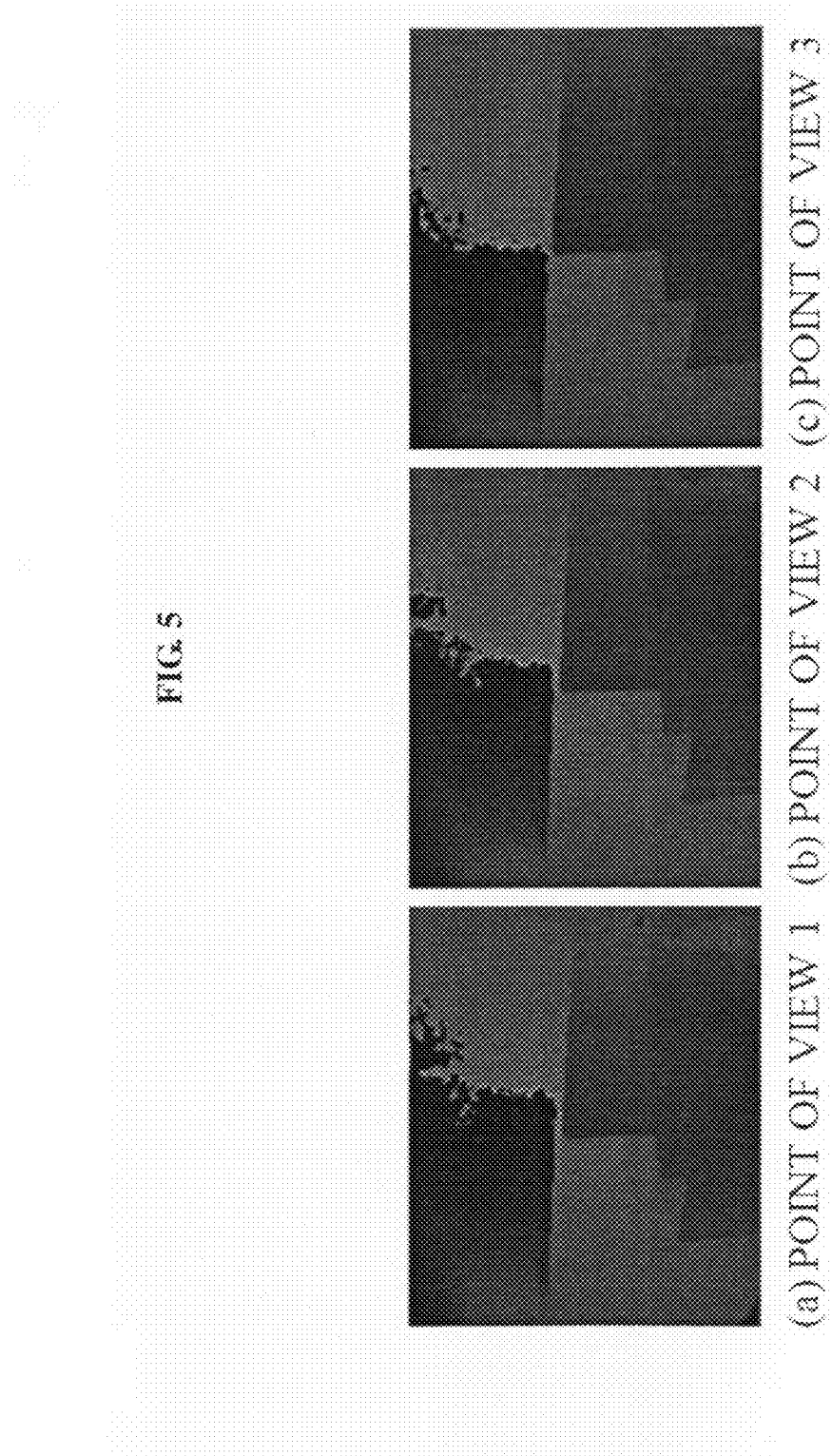
FIG. 5 illustrates depth images obtained by photographing the same scene at different points of view through a moving photographing device according to example embodiments.

FIG. 5 illustrates depth images obtained by photographing the same scene at different points of view using a moving photographing device according to example embodiments.

The multiple depth images may be obtained by photographing the same scene using the moving photographing device. The images in FIG. 5 may be multiple depth images photographed at different points of view based on the same modulation frequency. When the same scene is photographed at different points of view of the photographing device, the same object may look slightly different.

Figure 6:
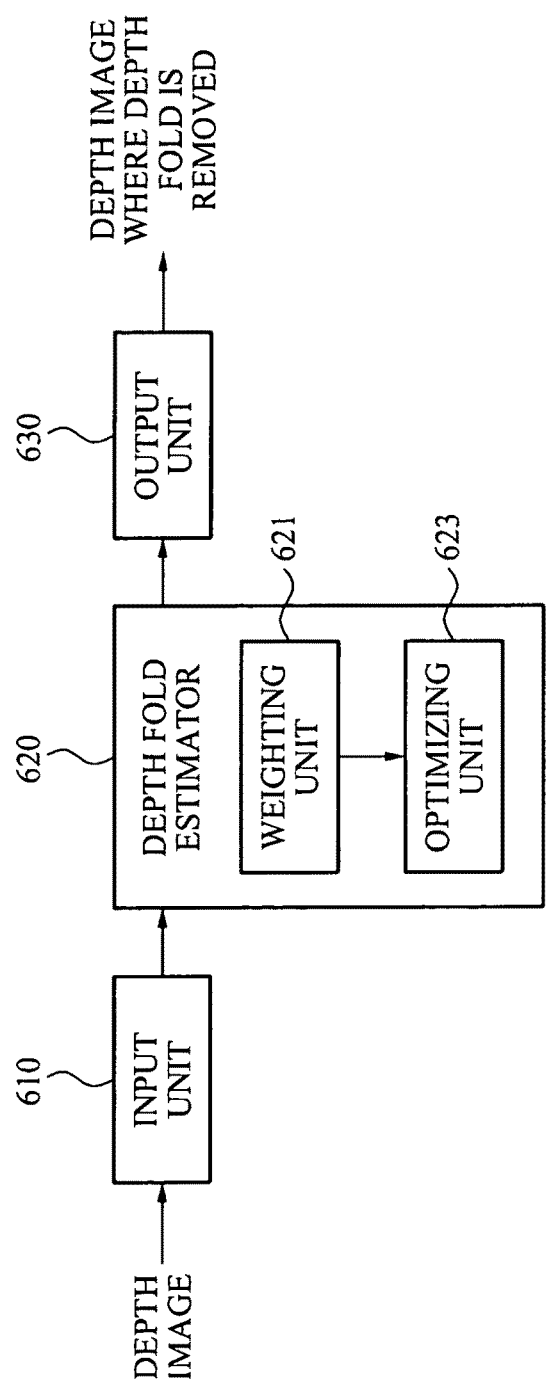
FIG. 6 is a block diagram illustrating a depth image unfolding apparatus of when a fixed photographing device is used according to example embodiments.

FIG. 6 illustrates a depth image unfolding apparatus in which a fixed photographing device is used according to example embodiments.

Referring to FIG. 6, the depth image unfolding apparatus may include, for example, an input unit 610, a depth fold estimator 620, and an output unit 630.

The input unit 610 may receive multiple depth images with respect to the same scene, the multiple depth images being photographed based on different modulation frequencies using the fixed photographing device. As described with reference to FIG. 4, the photographing device may photograph multiple depth images based on different modulation frequencies since the maximal distance varies depending on the modulation frequency.

The depth fold estimator 620 may estimate a number of depth folds based on a distance between 3D points of multiple pixels indicating the same location of the scene in the multiple depth images. The depth fold estimator 620 may sum smallest distances between the multiple 3D points, while changing a number of depth folds with respect to the multiple 3D points corresponding to the multiple pixels indicating the same location of the scene, and estimate a number of depth folds for which the sum is a minimal value, as an actual number of depth folds. The depth fold estimator 620 may estimate a number of depth folds for which the same 3D point is located in the same location, for each pixel, based, for example, on Equation 2.

$$D_i^m(k_i) = \sum_{n=1, n \neq m}^{3} \min_{p_i} \|X_i^m(k_i) - X_i^n(p_i)\| \quad \text{[Equation 2]}$$

In Equation 2, $D_i^m(k_i)$ may denote an objective function with respect to $k_i$ that is a number of depth folds included in a pixel i of an $m^{th}$ image.

The smallest distances between a 3D point $X_i^m(k_i)$ or which the number of depth folds in the pixel i of the $m^{th}$ image is $k_i$ and a 3D point $X_i^n(p_i)$ for which $p_i$, which is a number of depth folds in a pixel i of an $n^{th}$ image, is changed from zero to K are compared for each image. The objective function may be obtained by summing the smallest distances. When m is 1, n may be 2 or 3, while n may be changed based on the number of photographed images. In this example, the depth fold estimator 620 may estimate, as the actual number of depth folds, $k_i$ for which the objective function is a minimal value.

The depth fold estimator 620 may include a weighting unit 621 and an optimizing unit 623. The weighting unit 621 may apply a weight to a measured distance between the multiple 3D points based on a distance between 3D points corresponding to adjacent pixels, to enable depth values of the adjacent pixels in each of the multiple depth images to be similar. An image in which depth folds have been removed may show a partially inaccurate result, due to noise of a measured depth value. Therefore, the weight is applied to the distance between the measured distance of the 3D points measured based on Equation 3, Equation 3 being defined to enable depth values of two adjacent pixels to be similar. When a number of depth folds of each of the adjacent pixels is the same, the weighing unit 621 may apply zero to the adjacent pixels. When the number of depth folds of each of the adjacent pixels is different, the weighting unit 621 may apply a higher weight, as 3D coordinates of each of the pixels have greater similarity to each other.

$$V^n(k_i, k_j) = \begin{cases} \lambda_m \exp(-\beta_m \|X_i^m(0) - X_j^m(0)\|^2)/d(i,j), & \text{if } k_i \neq k_j, \|X_i^m(0) - X_j^m(0)\| < \tau_m \\ 0, & \text{otherwise} \end{cases} \quad \text{[Equation 3]}$$

In Equation 3, $V^m(k_i, k_j)$ may be an objective function that enables a pixel i and a pixel j, which are adjacent to each other in an $m^{th}$ image, to be similar to each other. d(i, j) may be a distance between the pixel i and the pixel j. For example, when image coordinates of the pixel i is (1,1) and image coordinates of the pixel j is (1,2), d(i, j) may be '1'. Therefore, in case where the 3D coordinates of the adjacent two pixels have long been similar before depth folds are removed, only when the number of depth folds of each of the two pixels is the same, may the 3D coordinates be maintained. $\lambda_m$, $\beta_m$, and $\tau_m$ may be positive constants determined by the user in the $m^{th}$ image. $\lambda_m=2$, $\beta_m=1/(2\sigma_m^2)$, $\tau_m=3\sigma_m$, and $\sigma_m=\Sigma\|X_i^m(0)-X_j^m(0)\|^2/N$. N may denote a number of pairs of pixels having similar depth values as the measured depth value.

The optimizing unit 623 may optimize each of the multiple depth images based on an image unit, using the distance between the multiple 3D points of the pixels indicating the same location of the scene, and using the weighted distance weighted based on the distance between the 3D points corresponding to the adjacent pixels. The optimizing unit 623 may estimate the number of depth folds based on the $m^{th}$ image unit, for example, based on Equation 4. The optimizing unit 623 may use a graph cut algorithm or a belief propagation algorithm to estimate a minimal value of Equation 4, namely, the number of depth folds.

$$C^m = \sum_i D_i^m(k_i) + \sum_i \sum_{j \in N(i)} V^m(k_i, k_j) \quad \text{[Equation 4]}$$

In Equation 4, $C^m$ may be an objective function used to calculate a number of depth folds of each pixel in the $m^{th}$ image.

$$\sum_i D_i^m(k_i)$$

may be the sum of the smallest distances of the 3D points corresponding the pixels for which the number of depth folds is to be estimated, and $$\sum_i \sum_{j \in N(i)} V^m(k_i, k_j)$$

may be the weighted distance weighted based on whether a number of depth folds of each of the two pixels having the similar depth values is similar. N(i) may denote four pixels or eight pixels that is most adjacent to the pixel i.

The output unit 630 may output multiple depth images where depth values are removed based on the estimated number of depth folds. When the number of depth folds is estimated, the output unit 630 may generate 3D coordinates where a depth fold is removed for each image, based on Equation 1.

Figure 7A:
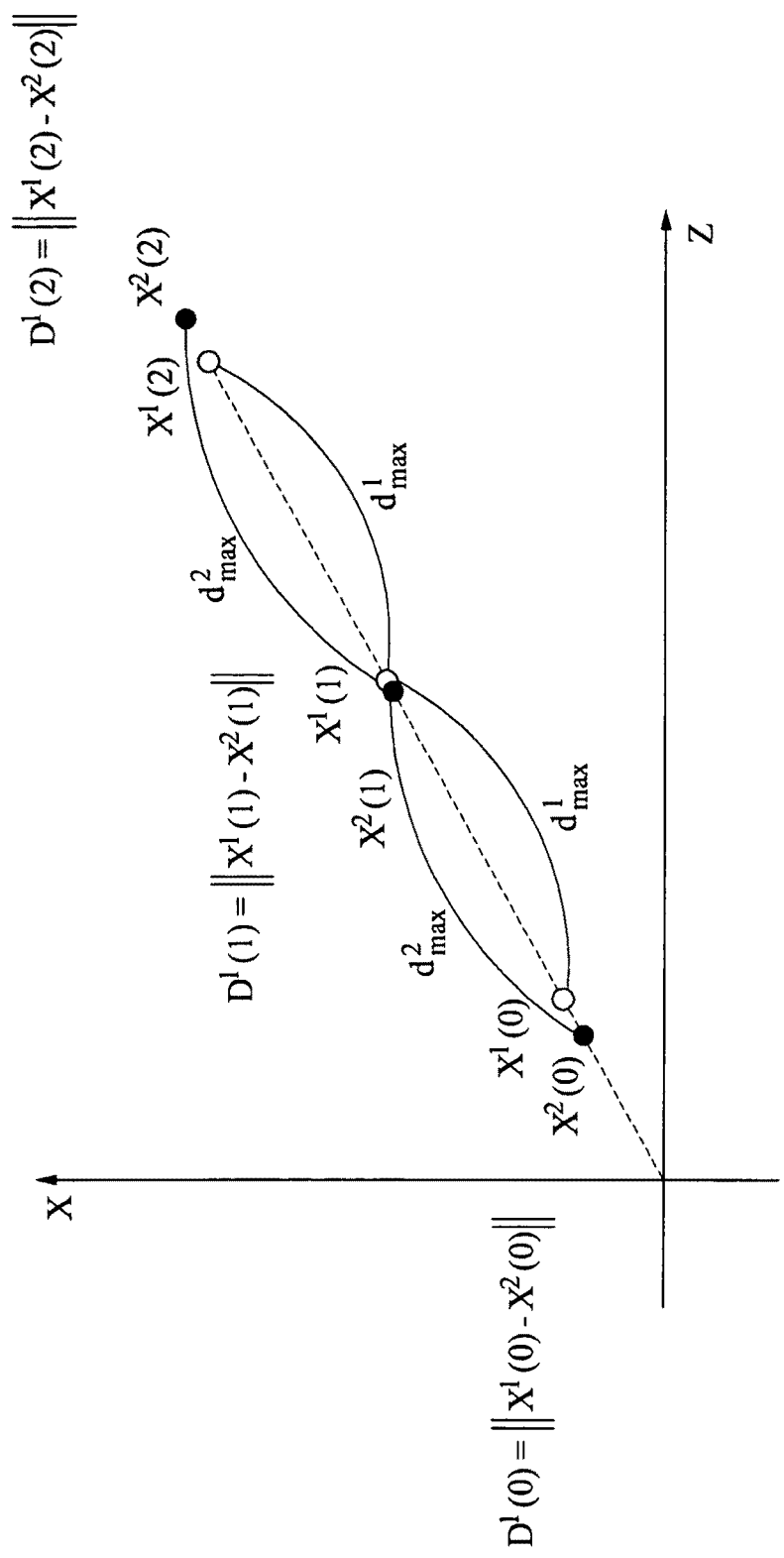
FIG. 7A illustrates a process estimating a number of depth folds using the depth fold estimator of FIG. 6.

FIG. 7A illustrates a process of estimating a number of depth folds using the depth fold estimator of FIG. 6.

The depth fold estimator 620 may estimate a point when a distance between 3D points of corresponding pixels in multiple depth images is a minimal, based on Equation 2 and thus, may estimate the number of depth folds. For example, it is assumed that 3D coordinates of the same pixel are compared with respect to a first image obtained based on 29 MHz and a second image obtained based on 30 MHz, while changing the number of depth folds. As the depth image is obtained using the fixed photographing device, a scene does not include any motion and the photographing device does not move and thus, the same 3D point may be projected on the same pixel. When the depth folds are removed from the two images, the 3D coordinates of the two images may be identical each other.

Referring to FIG. 7A, a case that obtains a smallest distance between 3D coordinates of two images is when a number of depth folds of the first image is the same as a number of depth folds of the second image, when the number of depth folds in the 3D coordinates of the first image is 0, 1, or 2 and the number of depth folds in the 3D coordinates of the second image is 0, 1, or 2. A case that obtains a smallest distance between 3D points is when the number of depth folds is '1' and thus, the depth fold estimator 620 may estimate the number of depth folds as '1'. Accordingly, $D^1(1)$ may be smaller than $D^1(0)$ and $D^1(2)$.

FIG. 7B illustrates images restored based on the estimated number of depth folds of FIG. 7A.

Referring to FIG. 7B, depth images are illustrated where depth folds have been removed by applying the estimated number of depth folds, namely, '1", to Equation 1. A depth image may be different for each modulation frequency that is used for photographing and thus, the depth images where the depth folds have been removed may be different for each modulation frequency. The depth images where depth folds have been removed in FIG. 7B may show enhanced results compared with the depth images where the depth folds have not been removed. However, the depth images where the depth folds have been removed may show partially inaccurate results, due to noise of measured depth values. To reduce affect from the noise, a weighting may be applied to enable depth values of adjacent pixels to be similar and an optimization may be performed based on an image unit.

Figure 8:
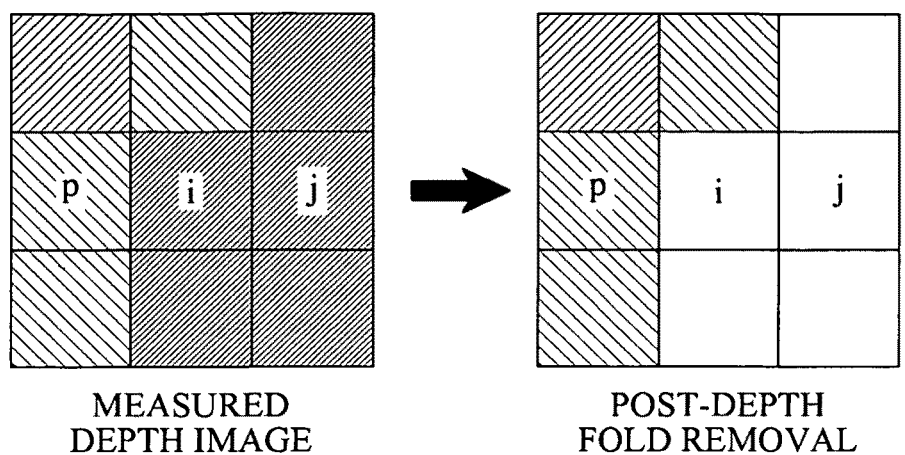
FIG. 8 illustrates an example of applying a weight when depth values of adjacent pixels are similar to each other according to example embodiments.

FIG. 8 illustrates an example of applying a weight when depth values of adjacent pixels are similar to each other according to example embodiments.

The weighting unit 621 may apply a weight to a measured distance between 3D points to enable adjacent pixels in a depth image to have similar 3D coordinates. Referring to FIG. 8, a pixel i and a pixel j in the measured depth image have similar colors and thus, may have similar depth values. In this example, the weighting unit 621 may apply the weight to the measured distance, to enable 3D coordinates of the measured pixel i and 3D coordinates of the measured pixel j to be the same based on Equation 3, even though depth folds are removed. Both the pixel i where the depth fold is removed and the pixel j where the depth fold is removed may have similar bright colors using the weighting unit 621. Adjacent pixels that have similar depth values to the pixel i in the measured depth image may also have similar depth values after the depth fold is removed.

Figure 9:
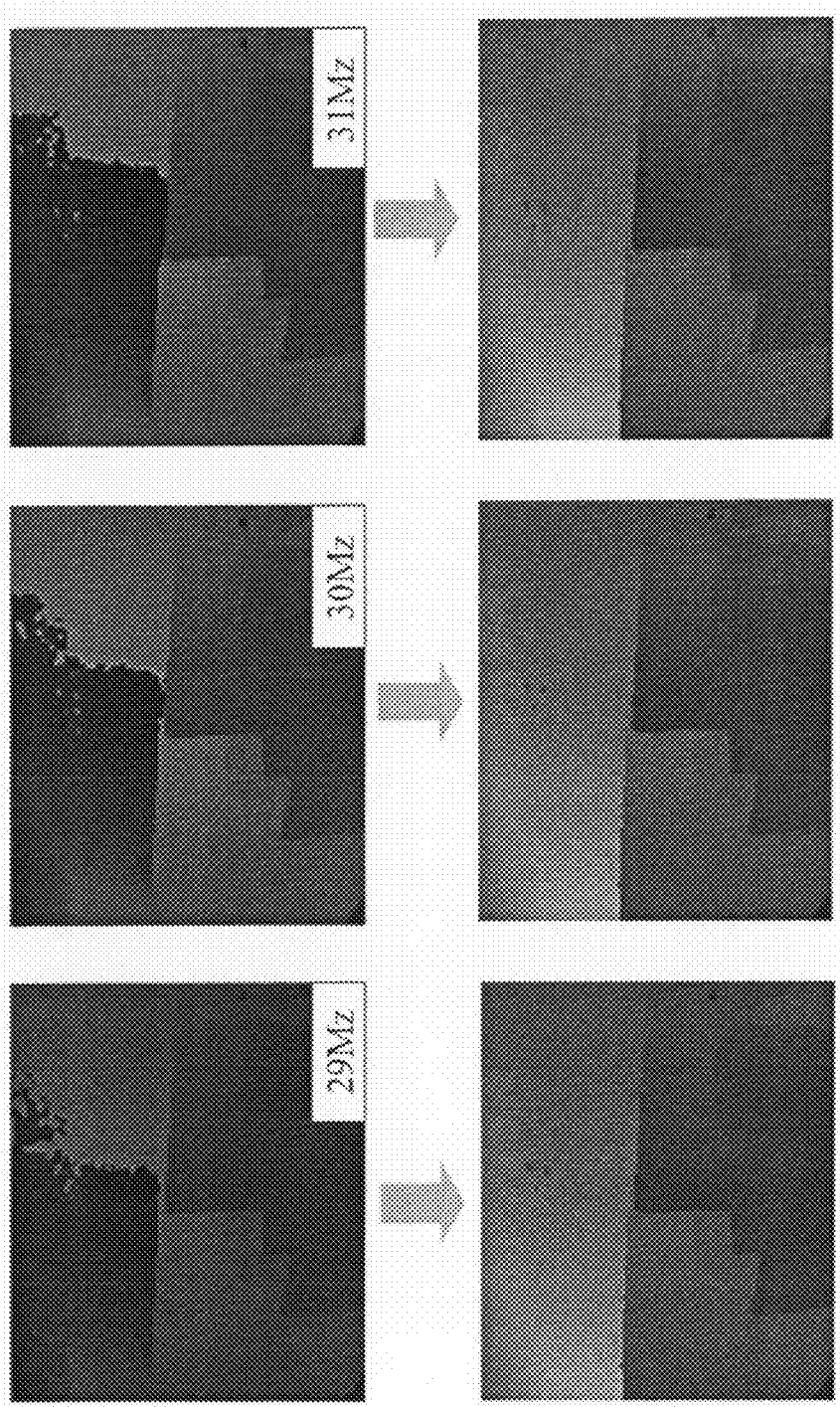
FIG. 9 illustrates images restored based on an estimated number of depth folds that is obtained by applying a weight and optimizing each of the multiple depth images.

FIG. 9 illustrates images restored based on an estimated number of depth folds that is obtained by applying a weight and optimizing each of the multiple depth images.

The optimizing unit 623 may uses a graph cut algorithm or a belief propagation algorithm to estimate a minimal value of Equation 4, namely, a number of depth folds. Referring to FIG. 9, depth images where depth folds are removed may be obtained by applying, to Equation 1, the number of depth folds estimated using multiple depth images photographed based on different modulation frequencies. The depth images where the depth folds are removed may show enhanced results compared with FIG. 7B.

Figure 10:
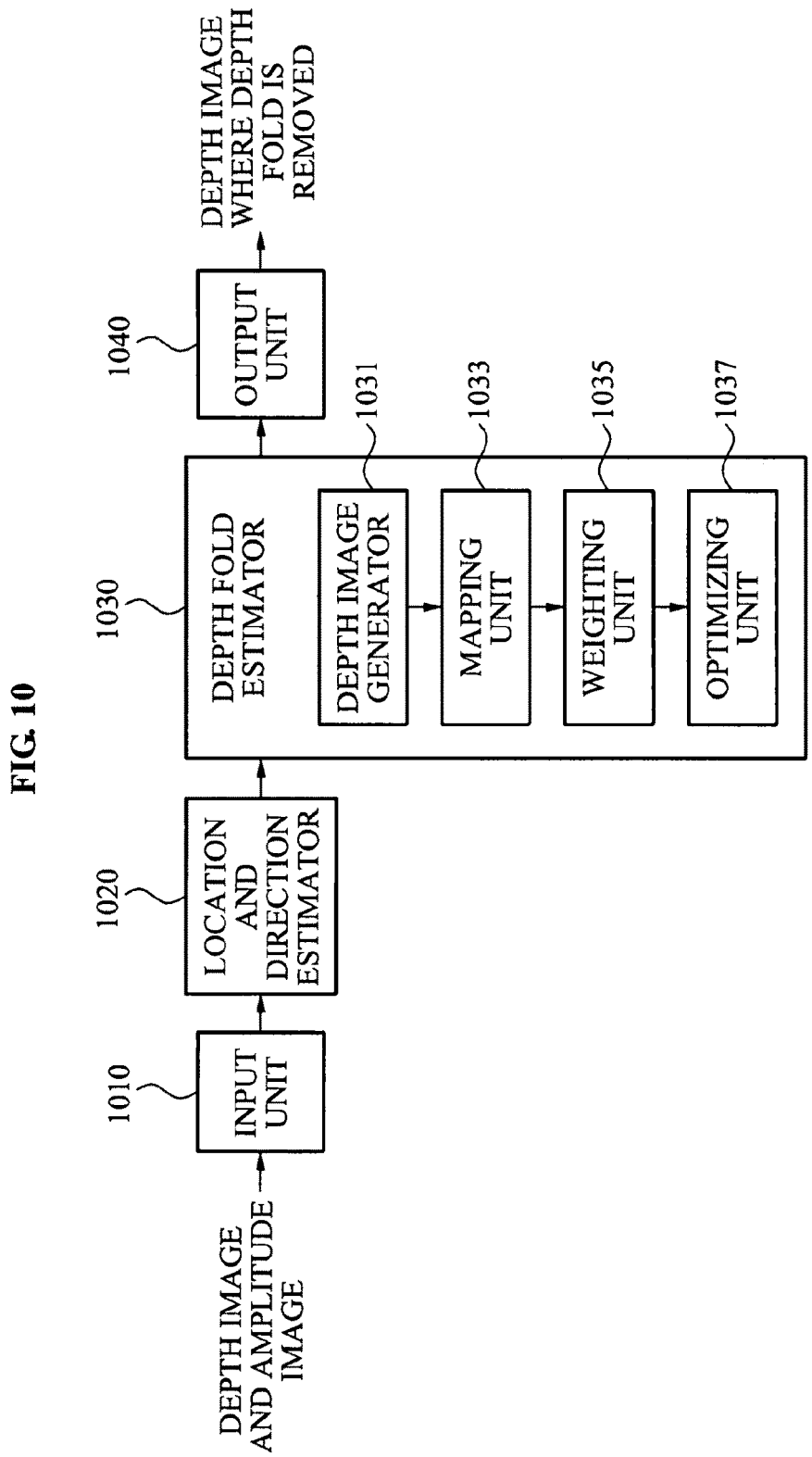
FIG. 10 is a block diagram illustrating a depth image unfolding apparatus of when a dynamic photographing device is used according to example embodiments.

FIG. 10 illustrates a depth image unfolding apparatus in which a dynamic photographing device is used according to example embodiments.

Referring to FIG. 10, the depth image unfolding apparatus may include, for example, an input unit 1010, a location and direction estimator 1020, a depth fold estimator 1030, and an output unit 1040.

The input unit 1010 may receive inputted multiple depth images and amplitude images with respect to the same scene, the multiple depth images and amplitude images being photographed while changing a location of a photographing device. As described with reference to FIG. 5, the photographing device may be moving and thus, the photographing device may obtain multiple depth images by photographing the same scene at different points of view.

The location and direction estimator 1020 may generate multiple corrected amplitude images based on the multiple depth images and amplitude images, and may estimate, based on the same 3D feature points located in the multiple corrected amplitude images, a location and direction of the photographing device corresponding to the multiple corrected amplitude images. The location and direction estimator 1020 may detect feature points with respect to the multiple corrected amplitude images, and may perform matching with respect to the detected feature points to estimate the location and direction of the photographing device corresponding to the multiple corrected amplitude images. The location and direction estimator 1020 may estimate a location and direction of the photographing device corresponding to all photographed depth images to make all of the photographed depth images appear as though the images are photographed at the same location.

In two depth images on which the same scene is projected, when 3D points respectively projected on the two depth images are $X^m$ and $X^n$, a relation between the two points may be represented by Equation 5.

$$X^m = R_{n \to m} X^n + T_{n \to m} \quad \text{[Equation 5]}$$

In Equation 5, $R_{n \to m}$ may denote a 3×3 rotation matrix, and $T_{n \to m}$ may denote a 3D translation vector. The location and direction estimator 1020 may estimate the $R_{n \to m}$, $T_{n \to m}$ to estimate the location and direction of the photographing device corresponding to images.

The location and direction estimator 1020 may generate a corrected amplitude image by multiplying an amplitude value of each pixel of an inputted amplitude image with the square of a range value read from a corresponding pixel of an inputted depth image. The location and direction estimator 1020 may generate the corrected amplitude image with respect to the same image.

The location and direction estimator 1020 may detect feature points from each of the multiple corrected amplitude image and may match feature points of two amplitude images. In this example, when changes in the two images are slight, a Kanade-Lucas-Tomasi (KLT) feature point may be used. Conversely, when changes in the two images are great, a Scale Invariant Feature Transform (SIFT) feature point may be used. The feature point matching may be performed selectively using one of the described schemes.

After the two feature points of the two amplitude images are matched, the location and direction estimator 1020 may merge a 3D point algorithm and a random sampling (RANSAC) scheme to estimate initial estimates of $R_{n \to m}$ and $T_{n \to m}$. and The location and direction estimator 1020 may use an iterated closed point algorithm to accurately correct the $R_{n \to m}$ and $T_{n \to m}$.

The depth fold estimator 1030 may estimate a number of depth folds based on a distance between a 3D point of a pixel generated based on the estimated location and direction of the photographing device and a 3D point of a pixel for which the number of depth folds is to be estimated.

The depth fold estimator 1030 may include a depth image generator 1031 and a mapping unit 1033. The depth image generator 1031 may generate new multiple depth images, while changing a number of depth folds with respect to all pixels of the multiple depth images. The depth image generator 1030 may generate a new image $I_n(p)$ while changing p from zero to K, where p is a number of depth folds with respect to all pixels of a depth image $I_n$. The mapping unit 1033 may map, to an image for which a number of depth folds is to be estimated, 3D points corresponding to all pixels in the new multiple depth images based on the estimated location and direction of the photographing device. The mapping unit 1033 may read 3D coordinates $X^n(p)$ with respect to all pixels of the new image $I_n(p)$, and may generated $Y^n(p)$ that expresses 3D coordinates $X^n(p)$ at a point of view of an $m^{th}$ image based on Equation 6. The mapping unit 1033 may map all 3D coordinates $X^n(p)$ of a new $n^{th}$ image into the $Y^n(p)$ of the $m^{th}$ image, while changing the number of depth folds from zero to K. Equation 6, for example, represents a relation of the mapping.

$$Y^n(p) = R_{n \to m} X^n(p) + T_{n \to m} \quad \text{[Equation 6]}$$

In this example, the depth fold estimator 1030 may estimate, as an actual number of depth folds, a number of depth folds applied to a mapped 3D point having a shortest distance to a 3D point of the image for which the number of depth folds is to be estimated. The depth fold estimator 1030 may estimate the number of depth folds based on Equation 7 for example. The depth fold estimator 1030 may estimate, as the actual number of depth folds, a number of depth folds applied to a point $Y_m^n$ that is most adjacent to $X_i^m(k_i)$ that is the pixel of $m^{th}$ image for which the number of depth folds is to be estimated, from among the all 3D coordinates mapped to $Y^n(p)$ of the $m^{th}$ image. The depth fold estimator 1030 may detect the point $Y_m^n$ that is most adjacent to $X_i^m(k_i)$ based on a kd-tree scheme.

$$D_i^m(k_i) = \sum_{n=1, n \neq m}^{3} \delta(\|X_i^m(k_i) - Y_*^n\|) \quad \text{[Equation 7]}$$

$$\delta(x) = \begin{cases} x, & \text{if } x < \tau, \\ \tau, & \text{otherwise.} \end{cases},$$

In Equation 7, $D^m(k_i)$ be an objective function with respect to $k_i$, that is a number of depth folds in a pixel i of the $m^{th}$ image. $\tau$ may be an arbitrary value. When m is '1', n may be '2' and '3' and n may vary depending on a number of images to be photographed. To remove the depth fold, two through K depth images may be used. The depth fold estimator 1030 may estimate, a number of depth folds for which the objective function has a minimal value, as the actual number of depth folds.

The depth fold estimator 1030 may sum distances between the 3D point of the image for which the number of depth folds is to be estimated and 3D points mapped to multiple images that have the shortest distances to the 3D point of the image for which the number of depth folds is to be estimated, and may estimate a number of depth folds of when the sum is a minimal value as the actual number of depth folds.

The depth fold estimator 1030 may include a weighting unit 1035 and an optimizing unit 1037. The weighting unit 1035 may apply a weight based on a distance between 3D points corresponding to adjacent pixels, to enable depth values of the adjacent pixels in each of the multiple depth images. The optimizing unit 1037 may optimize each of the multiple depth images based on an image unit, using a distance between a 3D point of a pixel generated based on the estimated location and a direction of the photographing device and the 3D point of the pixel for which the number of depth folds is to be estimated, and using the weighted value weighted based on the distance between the 3D points corresponding to the adjacent pixels. The weighting unit 1035 and the optimizing unit 1037 may perform operations in the same manner as that described for FIG. 6. But, in Equation 4 the factor $D^m(k_i)$ changed in the form of $$D_i^m(k_i) = \sum_{n=1, n \neq m}^{3} \delta(\|X_i^m(k_i) - Y_*^n\|).$$

Therefore, the optimizing unit 1037 may estimate the number of depth folds based on an image unit, using a graph cut algorithm or a belief propagation algorithm with respect to changed $C^m$ in equation 4.

The output unit 1040 may output multiple depth images where depth folds are removed based on the estimated number of depth folds. When the number of depth folds is estimated, the output unit 1040 may generate 3D coordinates where a depth fold is removed, for each image.

Figure 11:
FIG. 11 illustrates corrected amplitude images according to example embodiments.

FIG. 11 illustrates corrected amplitude images according to example embodiments.

The corrected amplitude images may be generated based on multiple depth images obtained by photographing the same scene from different points of view based on the same modulation frequency. A corrected amplitude image may be generated by multiplying an amplitude value of each pixel of an inputted amplitude image with the square of a range value read from a corresponding pixel of an inputted depth image.

Figure 12:
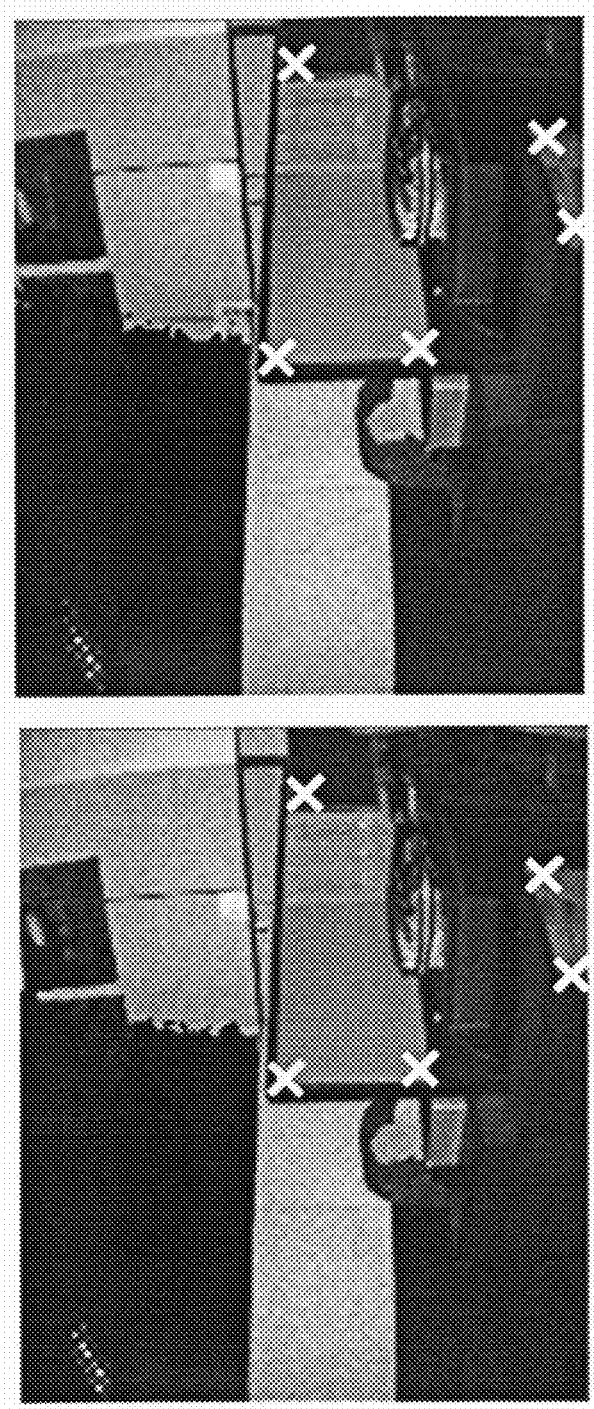
FIG. 12 illustrates feature points matched in a corrected amplitude image according to example embodiments.

FIG. 12 illustrates feature points matched in a corrected amplitude image according to example embodiments. A KLT feature point may be used, and when changes in the two images are great, an SIFT feature point may be used. Referring to FIG. 12, feature points are matched in each of an image at a point of view 1 and an image at a point of view 2.

Figure 13:
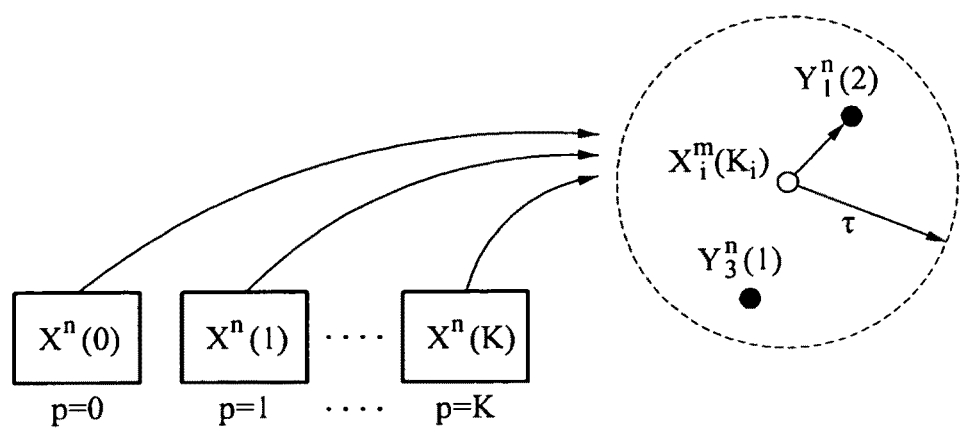
FIG. 13 illustrates a process of estimating a number of depth folds using a depth fold estimator of FIG. 10.

FIG. 13 illustrates a process of estimating a number of depth folds using a depth fold estimator of FIG. 10.

The depth fold estimator 1030 may generate a new image $I_n(p)$, while changing p from zero to k, where p is a number of depth folds with respect to all pixels of a depth image $I_n$. The depth fold estimator 1030 may read 3D coordinates $X''(0)$, $X''(1)$, ..., and $X''(K)$ with respect to the all pixels of the new image $I_n(p)$, and may generate $Y''(p)$ that expresses $X''(p)$ at a point of view of an $m^{th}$ image based on $Y''(p)=R_{n \rightarrow m}X''(p)+T_{n \rightarrow m}$. The depth fold estimator 1030 may detect, within a radius of τ, a point $Y_1''(2)$ that is most adjacent to $X_i'''(k_i)$ that is a pixel of the $m^{th}$ image for which a number of depth folds is to be estimated, and may estimate the number of depth folds based on $$D_i^m(k_i) = \sum_{n=1, n \neq m}^{3} \delta(\|X_i^m(k_i) - Y_*^n\|).$$

Figure 14:
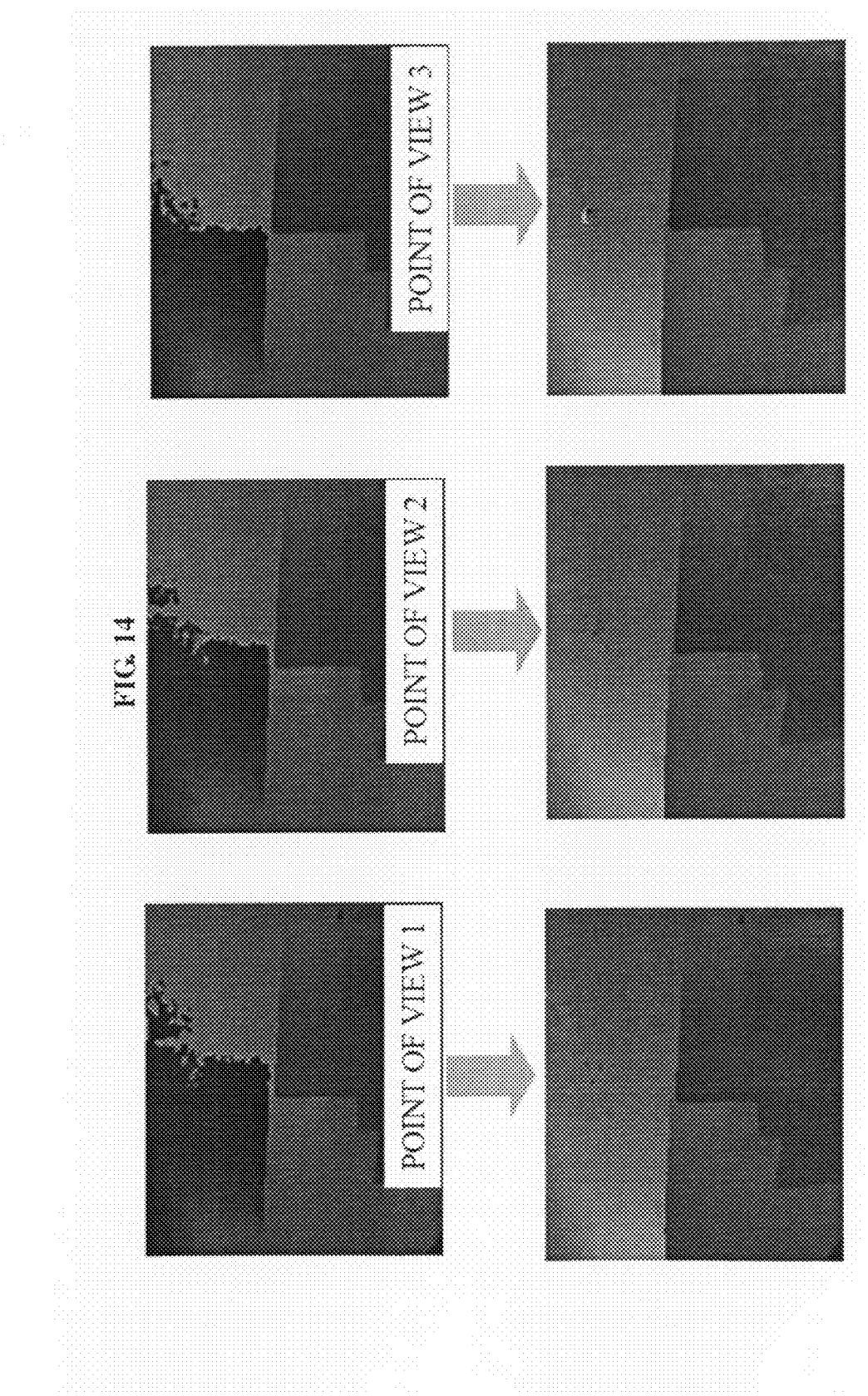
FIG. 14 illustrates images restored based on a estimated number of depth folds that is obtained by applying a weight and optimizing each of the multiple depth images when depth values of adjacent pixels are similar to each other according to example embodiments.

FIG. 14 illustrates images restored based on a estimated number of depth folds that is obtained by applying a weight and optimizing each of the multiple depth images when depth values of adjacent pixels are similar to each other according to example embodiments. The optimizing unit 1037 may use a belief propagation algorithm to estimate a minimal value of Equation 4, namely, the number of depth folds. The restored images where depth folds are removed may be obtained by applying, to Equation 1, the number of depth folds estimated using the belief propagation algorithm from the multiple depth images of FIG. 5 photographed at different points of view.

FIG. 15 illustrates a pre-depth fold removal three-dimensional (3D) structure and a post-depth fold removal 3D structure. Typically, it is not easy to express 3D as a 2D plane. However, when a depth fold is removed, measuring a depth of an image may be performed with respect to a greater range of images compared with images in which the depth fold has not yet been removed, and differences of depth values may be specified based on a distance.

Figure 16:
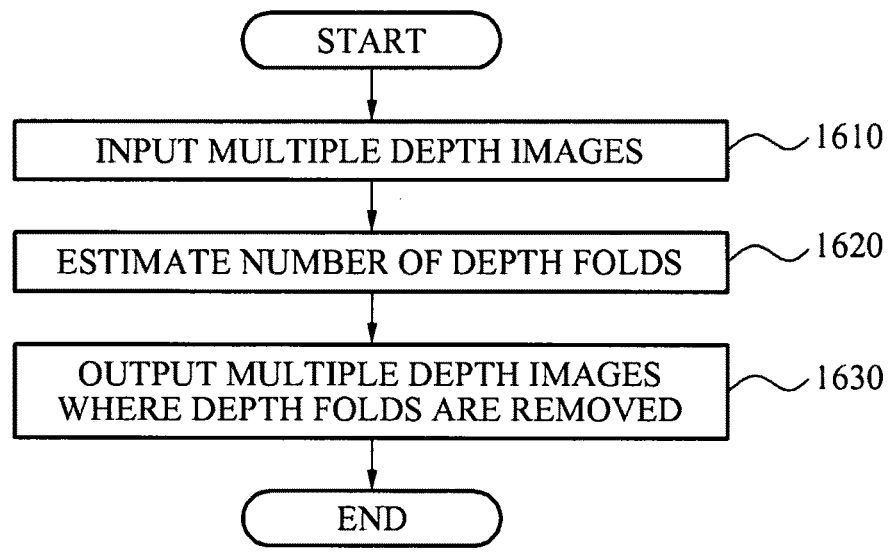
FIG. 16 is a flowchart illustrating a depth image unfolding method using a fixed photographing device according to example embodiments.

FIG. 16 illustrates a depth image unfolding method using a fixed photographing device according to example embodiments.

In operation 1610, a depth image unfolding apparatus receives inputted multiple depth images obtained by photographing the same scene. In this example, the inputted multiple depth images may be photographed based on different modulation frequencies of the fixed photographing device. The photographing device may photograph the multiple depth images, while changing a modulation frequency, since a measured maximal distance is dependent on the modulation frequency.

In operation 1620, the depth image unfolding apparatus estimates a number of depth folds for each of the multiple depth images. In this example, the depth image unfolding apparatus may estimate the number of depth folds based on a distance between 3D points of pixels indicating the same location of the same scene. The depth image unfolding apparatus may sum smallest distances between the multiple 3D points, while changing a number of depth folds with respect to the multiple 3D points corresponding to the multiple pixels indicating the same location of the scene, and may estimate a number of depth folds in which the sum is a minimal value, as an actual number of depth folds.

In operation 1630, the depth image unfolding apparatus outputs multiple depth images where depth folds are removed based on the estimated number of depth folds. When the number of depth folds is estimated, the depth image unfolding apparatus may generate 3D coordinates where a depth fold is removed based on Equation 1 for example, for each image.

FIG. 17 illustrates a depth image unfolding method using a dynamic photographing device according to example embodiments.

In operation 1710, the depth image unfolding apparatus receives inputted multiple depth images and amplitude images with respect to the same scene, and the multiple depth images and amplitude images are photographed, while changing a location of a photographing device. The photographing device may obtain the multiple depth images by photographing the same scene from different points of view, since the photographing device is moving.

In operation 1720, the depth image unfolding apparatus generate multiple corrected amplitude images based on the multiple depth images and amplitude images, and may estimate a location and a direction of the photographing device corresponding to multiple corrected amplitude images, based on the same 3D feature points located in the multiple corrected amplitude images. The depth image unfolding apparatus may detect feature points from each of the multiple corrected amplitude images, and may perform matching feature points of two amplitude images. In this example, when changes in the two images are slight, a KLT feature point may be used. When changes in the two images are great, a SIFT feature point may be used. The feature point matching may be performed selectively using one of the described schemes.

In operation 1730, the depth image unfolding apparatus may generate new multiple ksdepth images by changing a number of depth folds with respect to all pixels of the multiple inputted depth images.

In operation 1740, the depth image unfolding apparatus may map, to an image for which a number of depth folds is to be estimated, 3D points corresponding to all pixels of the new multiple depth images, based on the estimated location and direction of the photographing device.

In operation 1750, the depth image unfolding apparatus may apply a weight to a measured distance between 3D points, based on a distance between 3D points corresponding to adjacent pixels, to enable depth values of the adjacent pixels in each of the multiple depth images to be similar.

In operation 1760, the depth image unfolding apparatus optimizes each of the multiple depth images based on an image unit, using the distance between a 3D point of the pixel generated based on the estimated location and direction of the photographing device and a 3D point of a pixel for which a number of depth folds is to be estimated, and using the weighted distance weighted based on the distance between the 3D points corresponding to the adjacent pixels.

In operation 1770, the depth image unfolding apparatus may estimate the number of depth folds based on the distance between the 3D point of the pixel generated based on the estimated location and the direction of the photographing device and the 3D point of the pixel for which the number of depth folds is to be estimated. In this example, the image depth unfolding apparatus may estimate, as an actual number of depth folds, a number of depth folds of a mapped 3D point having a smallest distance to a 3D point of the image for which the number of depth folds is to be estimated. The depth image unfolding apparatus may sum distances between the 3D point of the image for which the number of depth folds is to be estimated and 3D points mapped to multiple images that has the shortest distances to the 3D point of the image for which the number of depth folds is to be estimated, and may estimate a number of depth folds of when the sum is a minimal value as the actual number of depth folds.

In operation 1780, the depth image unfolding apparatus outputs multiple depth images where the depth folds are removed based on the estimated number of depth folds. When the number of depth folds is estimated, the depth image unfolding apparatus may generate 3D coordinates where one or more depth folds have been removed, based, for example, on Equation 1, for each image.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The described hardware devices may be configured to act as one or more software modules in order to perform the operations of the above-described embodiments, or vice versa. The one or more methods of unfolding a depth image described herein may be executed on a general purpose computer or processor or may be executed on a particular machine such as the one or more apparatuses of unfolding a depth image described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for unfolding a depth image, the apparatus comprising:
    a processor to control one or more processor-executable units:
    an input unit to receive inputted multiple depth images with respect to a same scene, each of the multiple depth images being photographed based on different modulation frequencies of a fixed photographing device;
    a depth fold estimator to estimate a number of depth folds based on a distance between multiple three-dimensional (3D) points of multiple pixels indicating the same location of the scene in the multiple depth images; and
    an output unit to output the multiple depth images from which one or more depth folds have been removed based on the estimated number of depth folds,
    wherein each of the multiple depth images being photographed comprises a different maximum depth value as measured by the fixed photographing device.

2. The apparatus of claim 1, wherein the depth fold estimator sums smallest distances between the multiple 3D points while changing a number of depth folds with respect to the multiple 3D points corresponding to the multiple pixels indicating the same location of the scene, and estimates a number of depth folds of when the sum is a minimal value, as an actual number of depth folds.

3. The apparatus of claim 1, wherein the depth fold estimator comprises:
    a weighting unit to apply a weight to a distance measured between the multiple 3D points based on a distance between 3D points corresponding to adjacent pixels, to enable depth values of the adjacent pixels in each of the multiple depth images to be similar; and
    an optimizing unit to optimize each of the multiple depth images based on an image unit, using the distance between multiple 3D points of the multiple pixels indicating a same location of the scene, and using the distance weighted by the weighting unit.

4. The apparatus of claim 3, wherein the adjacent pixels correspond to four or eight pixels adjacent to a pixel for which a number of depth folds is to be estimated.

5. The apparatus of claim 3, wherein the optimizing unit performs optimizing based on a graph cut algorithm or a belief propagation algorithm.

6. An apparatus for unfolding a depth image, the apparatus comprising:
    a processor to control one or more processor-executable units:
    an input unit to receive inputted multiple depth images and amplitude images with respect to a same scene, the multiple depth images and amplitude images being photographed while changing a location of a photographing device;
    a location and direction estimator to generate multiple corrected amplitude images based on the multiple depth images and amplitude images, and to estimate, based on similar 3D feature points located in the multiple corrected amplitude images, a location and direction of the photographing device corresponding to the multiple corrected amplitude images;
    a depth fold estimator to estimate a number of depth folds based on a distance between a 3D point of a pixel generated based on the estimated location and direction of the photographing device and a 3D point of a pixel for which the number of depth folds is to be estimated; and
    an output unit to output the multiple depth images from which depth folds are removed based on the estimated number of depth folds.

7. The apparatus of claim 6, wherein the depth fold estimator comprises:
    a depth image generator to generate new multiple depth images by changing a number of depth folds with respect to all pixels of the multiple depth images; and
    a mapping unit to map, to an image for which a number of depth folds is to be estimated, 3D points corresponding to all pixels in the new multiple depth images based on the estimated location and direction of the photographing device,
    wherein a number of depth folds applied to a mapped 3D point that has a smallest distance to a 3D point of the image for which the number of depth folds is to be estimated is estimated as an actual number of depth folds.

8. The apparatus of claim 6, wherein the depth fold estimator comprises:
a weighting unit to apply a weight to a measured distance between the 3D points based on a distance between 3D points corresponding to adjacent pixels, to enable depth values of the adjacent pixels in each of the multiple depth images to be similar; and
an optimizing unit to optimize each of the multiple depth images based on an image unit, using the distance between the 3D point of the pixel generated based on the estimated location and direction of the photographing device and the 3D point of the pixel for which the number of depth folds is to be estimated, and using the distance weighted by the weighting unit.

9. The apparatus of claim 6, wherein the location and direction estimator detects feature points with respect to the multiple corrected amplitude images, and performs matching with respect to the detected feature points to estimate the location and direction of the photographing device corresponding to the multiple corrected amplitude images.

10. A method of unfolding a depth image, the method comprising:
receiving inputted multiple depth images with respect to a same scene, each of the multiple depth images being photographed based on different modulation frequencies of a fixed photographing device;
estimating a number of depth folds based on a distance between multiple 3D points of multiple pixels indicating the same location of the scene in the multiple depth images; and
outputting, by way of a processor, the multiple depth images from which one or more depth folds have been removed based on the estimated number of depth folds,
wherein each of the multiple depth images being photographed comprises a different maximum depth value as measured by the fixed photographing device.

11. The method of claim 10, wherein the estimating comprises summing smallest distances between the multiple 3D points while changing a number of depth folds with respect to the multiple 3D points corresponding to the multiple pixels indicating the same location of the scene, and estimating a number of depth folds of when the sum is a minimal value, as an actual number of depth folds.

12. The method of claim 10, wherein the estimating comprises:
applying a weight to a distance measured between the multiple 3D points based on a distance between 3D points corresponding to adjacent pixels, to enable depth values of the adjacent pixels in each of the multiple depth images to be similar; and
optimizing each of the multiple depth images based on an image unit, using the distance between multiple 3D points of the multiple pixels indicating a same location of the scene, and using the distance weighted based on the distance between the 3D points corresponding to the adjacent pixels.

13. The method of claim 12, wherein the adjacent pixels correspond to four or eight pixels adjacent to a pixel for which a number of depth folds is to be estimated.

14. The method of claim 12, wherein the optimizing unit performs optimizing based on a graph cut algorithm or a belief propagation algorithm.

15. A non-transitory computer-readable medium comprising a program for instructing a computer to perform the method of claim 10.

16. A method of unfolding a depth image, the method comprising:
receiving inputted multiple depth images and amplitude images with respect to a same scene, and the multiple depth images and amplitude images are photographed while changing a location of a photographing device;
generating multiple corrected amplitude images based on the multiple depth images and amplitude images, and estimating, based on similar 3D feature points located in the multiple corrected amplitude images, a location and direction of the photographing device corresponding to the multiple corrected amplitude images;
estimating a number of depth folds based on a distance between a 3D point of a pixel generated based on the estimated location and direction of the photographing device and a 3D point of a pixel for which the number of depth folds is to be estimated; and
outputting, by way of a processor, the multiple depth images from which depth folds are removed based on the estimated number of depth folds.

17. The method of claim 16, wherein the estimating of the number of the depth folds comprises:
generating new multiple depth images by changing a number of depth folds with respect to all pixels of the multiple depth images; and
mapping, to an image for which a number of depth folds is to be estimated, 3D points corresponding to all pixels in the new multiple depth images based on the estimated location and direction of the photographing device,
wherein a number of depth folds applied to a mapped 3D point that has a smallest distance to a 3D point of the image for which the number of depth folds is to be estimated is estimated as an actual number of depth folds.

18. The method of claim 16, wherein the estimating of the number of the depth folds comprises:
applying a weight to a measured distance between the 3D points based on a distance between 3D points corresponding to adjacent pixels, to enable depth values of the adjacent pixels in each of the multiple depth images to be similar; and
optimizing each of the multiple depth images based on an image unit, using the distance between the 3D point of the pixel generated based on the estimated location and direction of the photographing device and the 3D point of the pixel for which the number of depth folds is to be estimated, and using the distance weighted based on the distance between the 3D points corresponding to the adjacent pixels.

19. The method of claim 16, wherein the estimating of the location and direction comprises:
detecting feature points with respect to the multiple corrected amplitude images, and matching with respect to the detected feature points to estimate the location and direction of the photographing device corresponding to the multiple corrected amplitude images.

20. An apparatus for unfolding a depth image using multiple depth images of a particular scene where each depth image of the scene is photographed using a different camera modulation frequency, the apparatus comprising:
a processor to control one or more processor-executable units:
a depth fold estimating unit to estimate a number of depth folds based on a distance between multiple three-dimensional (3D) points of multiple pixels indicating an identical location of the scene in the multiple depth images; and an output unit to output multiple depth images from which depth folds have been removed based on the estimated number of depth folds, wherein each depth image of the scene being photographed comprises a different maximum depth value as measured by the camera.

21. The apparatus of claim 20, wherein the depth fold estimating unit sums smallest distances between the multiple 3D points while changing a number of depth folds with respect to the multiple 3D points corresponding to the multiple pixels indicating the same location of the scene, and estimates a number of depth folds for which the sum is a minimal value as an actual number of depth folds.

* * * * *

UNITED STATES PATENT AND TRADEMARK OFFICE
CERTIFICATE OF CORRECTION

PATENT NO.         : 8,577,089 B2                                    Page 1 of 1
APPLICATION NO.    : 13/064096
DATED              : November 5, 2013
INVENTOR(S)        : Ouk Choi et al.

It is certified that error appears in the above-identified patent and that said Letters Patent is hereby corrected as shown below:

On the Title Page, In Column 2 Item (56) (Other Publications), Line 4, Delete "Camers" and insert -- Camera --, therefor.

Signed and Sealed this
Eleventh Day of February, 2014

Michelle K. Lee
*Deputy Director of the United States Patent and Trademark Office*